United States Patent
Chi (10) Patent No.: US 7,175,150 B2
(45) Date of Patent: Feb. 13, 2007

(54) COMPOUND VIBRATION DAMPER ASSEMBLY

(75) Inventor: Ching-Hsung Chi, Hsin-Chu Hsien (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 0 days.

(21) Appl. No.: 10/851,127

(22) Filed: May 24, 2004

(65) Prior Publication Data

US 2005/0258331 A1   Nov. 24, 2005

(51) Int. Cl.
*F16M 13/00* (2006.01)
(52) U.S. Cl. .................. 248/562; 248/565; 267/140.12
(58) Field of Classification Search ................ 248/562, 248/564, 565, 566, 577, 578, 311.2; 267/136, 267/140.11, 140.12, 140.13, 140.3, 140.4, 267/287, 289; 108/57.12
See application file for complete search history.

(56) References Cited

U.S. PATENT DOCUMENTS

| | | | | | |
|---|---|---|---|---|---|
| 4,496,130 | A | * | 1/1985 | Toyama ...................... 248/585 |
| 4,805,359 | A | * | 2/1989 | Miyake et al. ............. 52/167.6 |
| 4,991,412 | A | * | 2/1991 | Bauer et al. ................. 68/23.1 |
| 5,370,352 | A | * | 12/1994 | Platus ......................... 248/619 |
| 5,624,104 | A | * | 4/1997 | Hukuda et al. ............... 267/34 |
| 5,669,594 | A | * | 9/1997 | Platus et al. ................ 248/619 |
| 5,765,800 | A | * | 6/1998 | Watanabe et al. ........... 248/550 |
| 5,833,204 | A | * | 11/1998 | Platus et al. ................ 248/619 |
| 6,079,698 | A | * | 6/2000 | Patterson et al. ............. 267/33 |
| 6,676,101 | B2 | * | 1/2004 | Platus ......................... 248/603 |
| 2002/0145242 | A1 | * | 10/2002 | Miyamoto et al. .......... 267/220 |

FOREIGN PATENT DOCUMENTS

TW           23879           8/1978

* cited by examiner

*Primary Examiner*—A. Joseph Wujciak, III
(74) *Attorney, Agent, or Firm*—Rosenberg, Klein & Lee (57) ABSTRACT

A compound vibration damper assembly includes a vertical damping unit fixedly connected at a lower end to a locating surface for absorbing a Z-direction vibration force transmitted to a target apparatus, and a horizontal damping unit connected at a lower end to an upper end of the vertical damping unit and at an upper end to a bottom of the target apparatus for absorbing X- or Y-direction vibration force transmitted to the target apparatus. The vertical damping unit includes a locating base, a central column, a supporting plate, and a vertical vibration force damping member disposed between the supporting plate and the locating base; and the horizontal damping unit includes an horizontal vibration force damping member located between an elastomeric base plate and an elastomeric top plate.

9 Claims, 7 Drawing Sheets

COMPOUND VIBRATION DAMPER ASSEMBLY

BACKGROUND OF THE INVENTION

1. Field of the Invention

The present invention relates to a vibration damper, and more particularly to a compound vibration damper assembly that supports and fixedly connects a target apparatus thereon to a locating surface, and absorbs X-, Y-, and Z-direction vibration forces transmitted to the target apparatus.

2. Description of the Prior Art

It is a common practice to mount computers, measuring apparatus, and/or control apparatus on work platforms, control platforms, and/or assembling platforms in industrial locations, so as to perform necessary industrial procedure control, measurement, calibration, correction, etc. Conventionally, these computers, measuring apparatus, and/or control apparatus are normally directly locked to the work, control, and/or assembling platforms using fastening means.

It is known that industrial locations require much more strict environmental conditions than that required by office or commercial locations. Therefore, relatively high standards of environmental receptivity are set for computers, measuring apparatus, and/or control apparatus mounted in industrial environments. For example, periodic or irregular or casual vibration that often occur in an industrial location very possibly have adverse influences on or even cause undesired damages to the computers, measuring apparatus, and/or control apparatus mounted therein.

To minimize the possible adverse influences of such periodic or unpredictable vibration on the computers, measuring apparatus, and/or control apparatus mounted in the industrial locations, damping measures are normally taken to particularly protect the computers, measuring apparatus, and/or control apparatus against vibration. For example, a vibration-absorbing structure is designed for or a vibration-resistant element is mounted on the hard disk or other internal components in the computers, measuring apparatus, and/or control apparatus that require vibration protection.

However, it is found the conventional vibration protection measures provide only limited effect in actual use because main bodies of the computers, measuring apparatus, and/or control apparatus are not well protected against vibration. Vibration forces produced by the work platform, the control platform, and/or the control platform could not be effectively isolated or absorbed and are directly transmitted to the main bodies of the computers, measuring apparatus, and/or control apparatus, and further to different components inside the main bodies, via the screwed joints between these apparatus and the platforms. Moreover, it is also often found in actual industrial locations that the screwed joints between the computers, measuring apparatus, and/or control apparatus and their respective locating platforms tend to become loosened under vibration over a long time to adversely affect normal work of the apparatus.

To achieve effective vibration isolation in industrial locations, the vibration protection taken for this purpose not only has to consider periodic and unpredictable vibration factors, but also the directions, including X, Y, and Z directions, in which the vibration forces are transmitted. However, all the currently available vibration protections fail to meet this requirement.

It is therefore desirable to develop a vibration damper that provides enhanced vibration damping effects to eliminate the drawbacks existed in the conventional techniques to meet actual needs in industrial locations.

SUMMARY OF THE INVENTION

A primary object of the present invention is to provide a compound vibration damper assembly, which includes a vertical vibration force damping member such as for absorbing a Z-direction vibration force, and a horizontal vibration force damping member made of a rubber material for absorbing X- and Y-direction vibration forces, so as to achieve good vibration damping effect in all directions.

Another object of the present invention is to provide a compound vibration damper assembly that includes a vertical damping unit and a horizontal damping unit. When a target apparatus is supported on a plurality of the compound vibration damper assemblies, vibration forces transmitted to the target apparatus in all directions could be effectively absorbed and isolated.

A further object of the present invention is to provide a compound vibration damper assembly that is suitable for use in industrial locations. When a target apparatus, such as a computer, a measuring apparatus, or a control apparatus, is mounted on a locating surface, such as a work platform, a control platform, or an assembling platform in the industrial location, via the compound vibration damper assemblies of the present invention, the target apparatus is fully vibration-protected.

To achieve the above objects, in accordance with the present invention, there is provided a compound vibration damper assembly which includes a vertical damping unit and a horizontal damping unit. The vertical damping unit includes a locating base, a central column, a supporting plate, and a vertical vibration force damping member disposed between the supporting plate and the locating base; and the horizontal damping unit includes an horizontal vibration force damping member located between an elastomeric base plate and an elastomeric top plate. Preferably, the horizontal vibration force damping member is a hollow cylindrical member made of a rubber material or other material providing similar elasticity.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
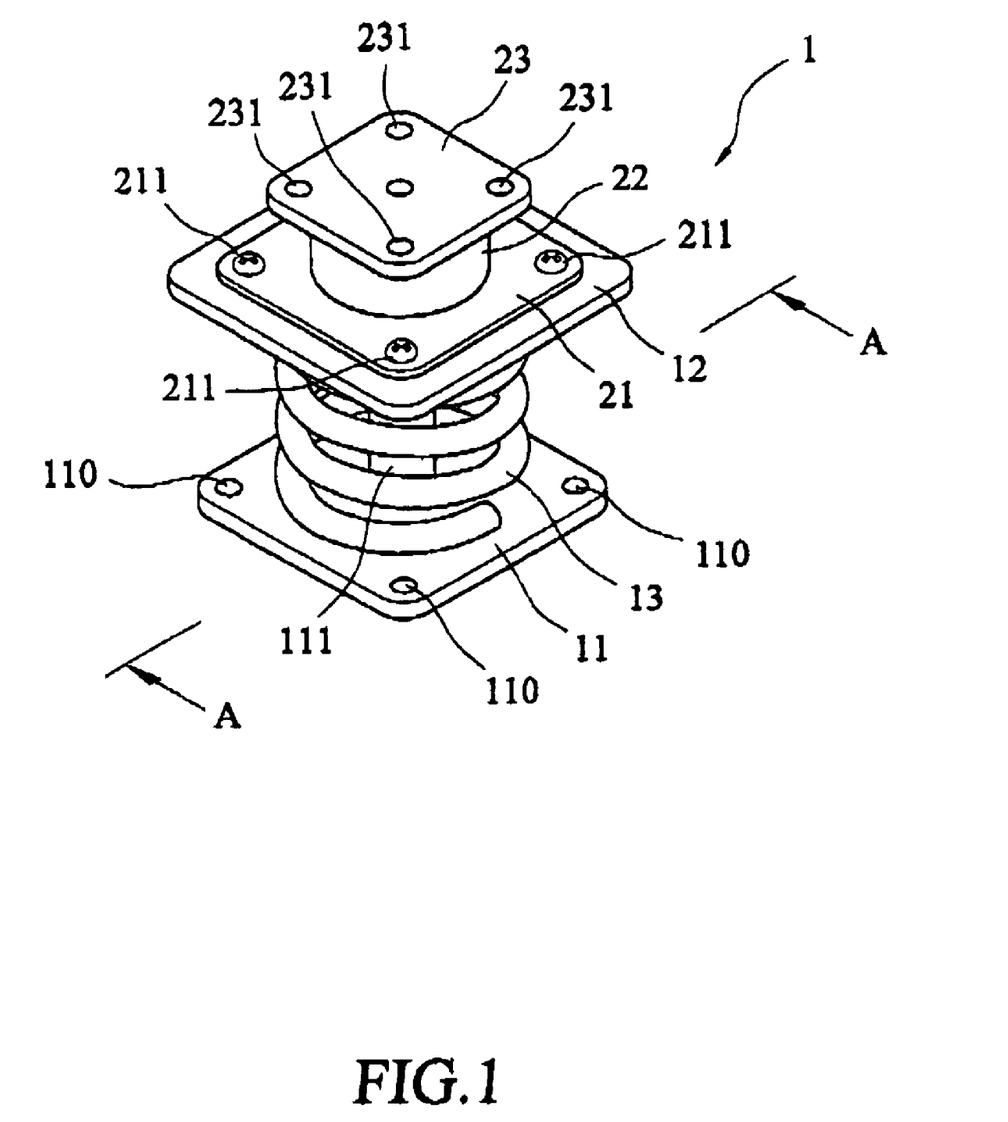
FIG. 1 is a perspective view of a compound vibration damper assembly according to a preferred embodiment of the present invention.
Figure 2:
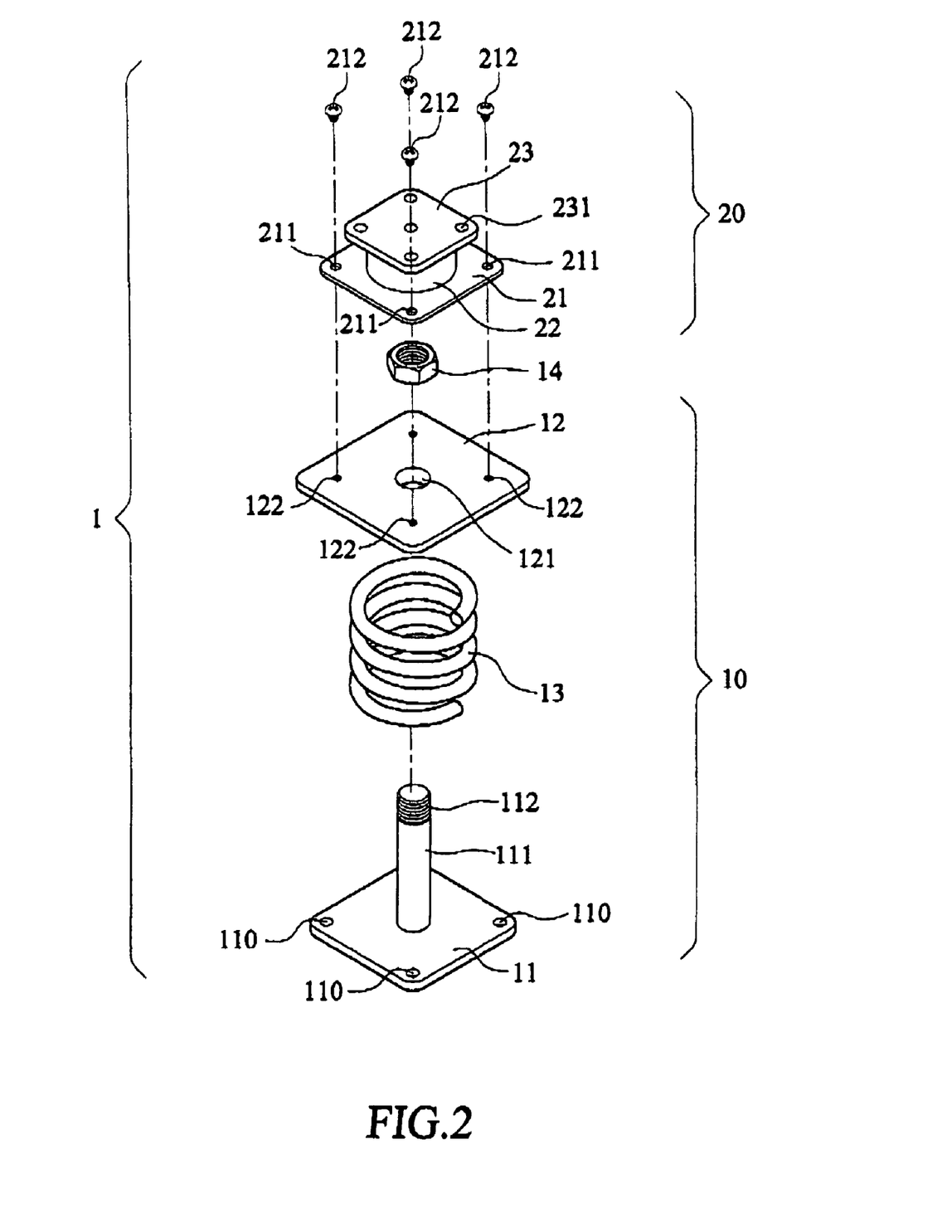
FIG. 2 is an exploded perspective view of FIG. 1.

Please refer to FIGS. 1 and 2 that are assembled and exploded perspective views, respectively, of a compound vibration damper assembly 1 according to a preferred embodiment of the present invention. As shown, the compound vibration damper assembly 1 mainly includes a vertical damping unit 10 and a horizontal damping unit 20. The vertical damping unit 10 is connected at a lower end to a locating surface, which may be, for example, a work platform, a control platform, or an assembling platform in an industrial location, for absorbing a Z-direction vibration force transmitted to a target apparatus, such as an industrial computer, a measuring apparatus, or a control apparatus. The horizontal damping unit 20 is connected to an upper end of the vertical damping unit 10, and has a flat top adapted to support the target apparatus, so as to absorb an X-direction or a Y-direction vibration force transmitted to the target apparatus.

The vertical damping unit 10 includes a locating base 11, which may be square, round or any other suitable shape, and is provided with a plurality of through holes 110, via which general screws may be extended to lock the locating base 11 to a desired locating surface.

A central column 111 is upward projected from an upper side of the locating base 11, and a predetermined axial length of external screw threads 112 are provided at an upper end of the central column 111. A supporting plate 12 is associated with the externally threaded upper end 112 of the central column 111, and a vertical vibration force damping member 13 is mounted around the central column 111 between the supporting plate 12 and the locating base 11. The supporting plate 12 is provided with a central opening 121, via which the externally threaded upper end 112 of the central column 111 is projected from the supporting plate 12 to engage with a nut 14. Preferably, the vertical vibration force damping member 13 is made of elastic element such as coil spring. The vertical vibration force damping member 13 serves as an elastic vertical damping element in the present invention to absorb a Z-direction vibration force.

Figure 3:
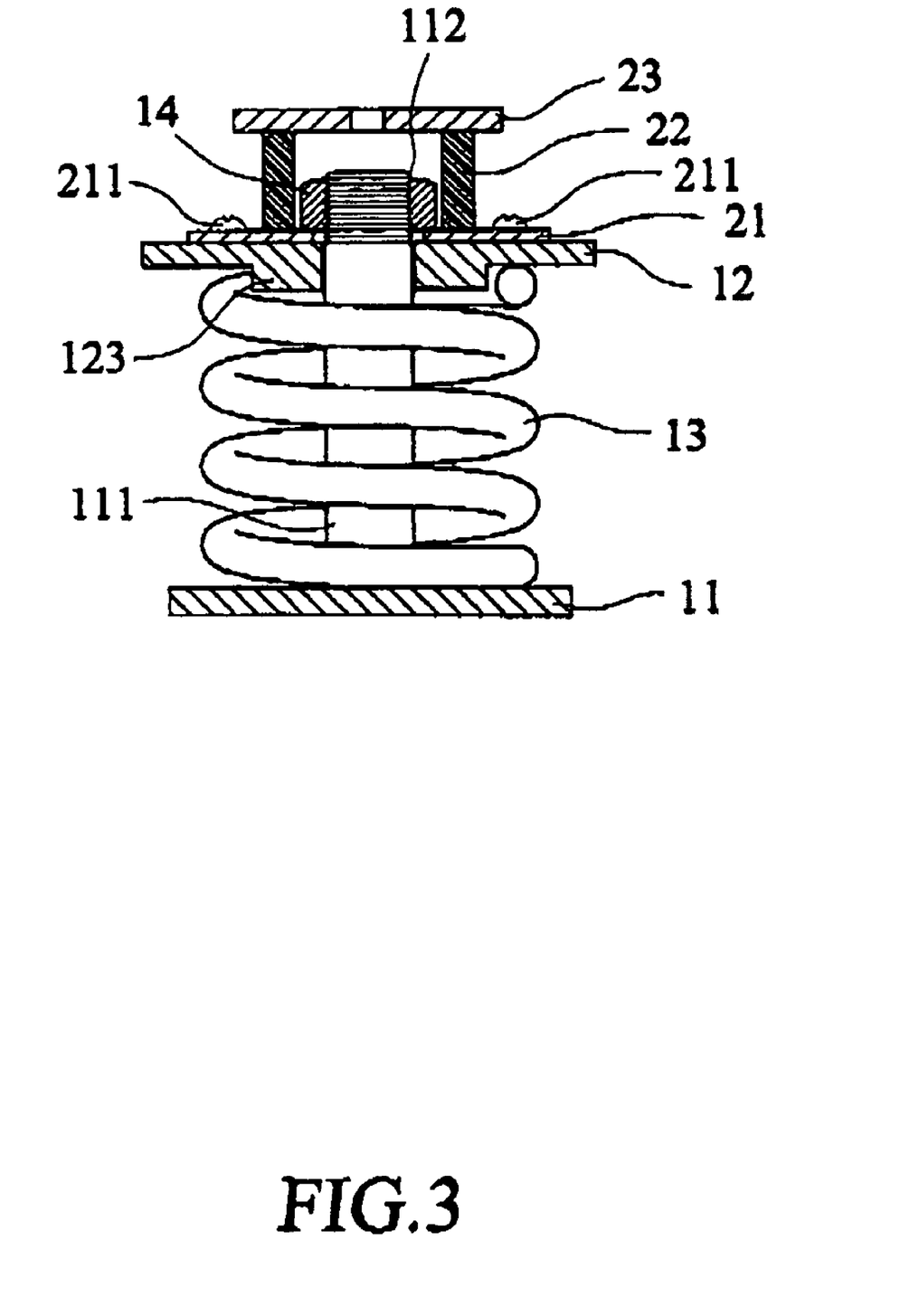
FIG. 3 is a sectional view taken along line A—A of FIG. 1.

Please refer to FIG. 3 that is a sectional view taken along line A—A of FIG. 1. In the preferred embodiment of the present invention, the supporting plate 12 is provided at a lower central portion with a downward extended round head 123. The vertical vibration force damping member 13 is firmly associated with the supporting plate 12 by fitly winding an uppermost turn of the vertical vibration force damping member 13 around the round head 123. With these arrangements, the coil spring 13 is stably located between the supporting plate 12 and the locating base 11 without the risk of deviating or separating from this position.

The horizontal damping unit 20 includes an elastomeric base plate 21, a horizontal vibration force damping member 22, and an elastomeric top plate 23. The base plate 21 is provided with a plurality of through holes 211 corresponding to screw holes 122 provided on the supporting plate 12, so that the elastomeric base plate 21 may be fixed to an upper side of the supporting plate 12 by threading general screws 212 through the through holes 211 on the base plate 21 to engage with the screw holes 122.

The horizontal vibration force damping member 22 is a hollow cylindrical member made of a rubber material or other material providing similar elasticity. The horizontal vibration force damping member 22 is fixedly connected at a lower end to a top central area of the elastomeric base plate 21 using conventional bonding technique. As can be seen from FIG. 3, the horizontal vibration force damping member 22 defines an internal receiving space of a predetermined size adapted to receive the nut 14 therein. The internal receiving space of the horizontal vibration force damping member 22 also provides a vertical travel space for the upper end 112 of the central column 111 of the vertical damping unit 10 when a Z-direction vibration force is applied to the coil spring 13.

The horizontal vibration force damping member 22 is also fixedly connected at an upper end to the elastomeric top plate 23 through conventional bonding technique. The top plate 23 is provided with a plurality of through holes 231, via which general screws (not shown) may be extended to screw into the target apparatus. Alternatively, the top plate 23 may be designed to include quick sliding keys or retaining buttons to quickly connect the compound vibration damper assembly of the present invention to the bottom of the target apparatus.

Figure 4:
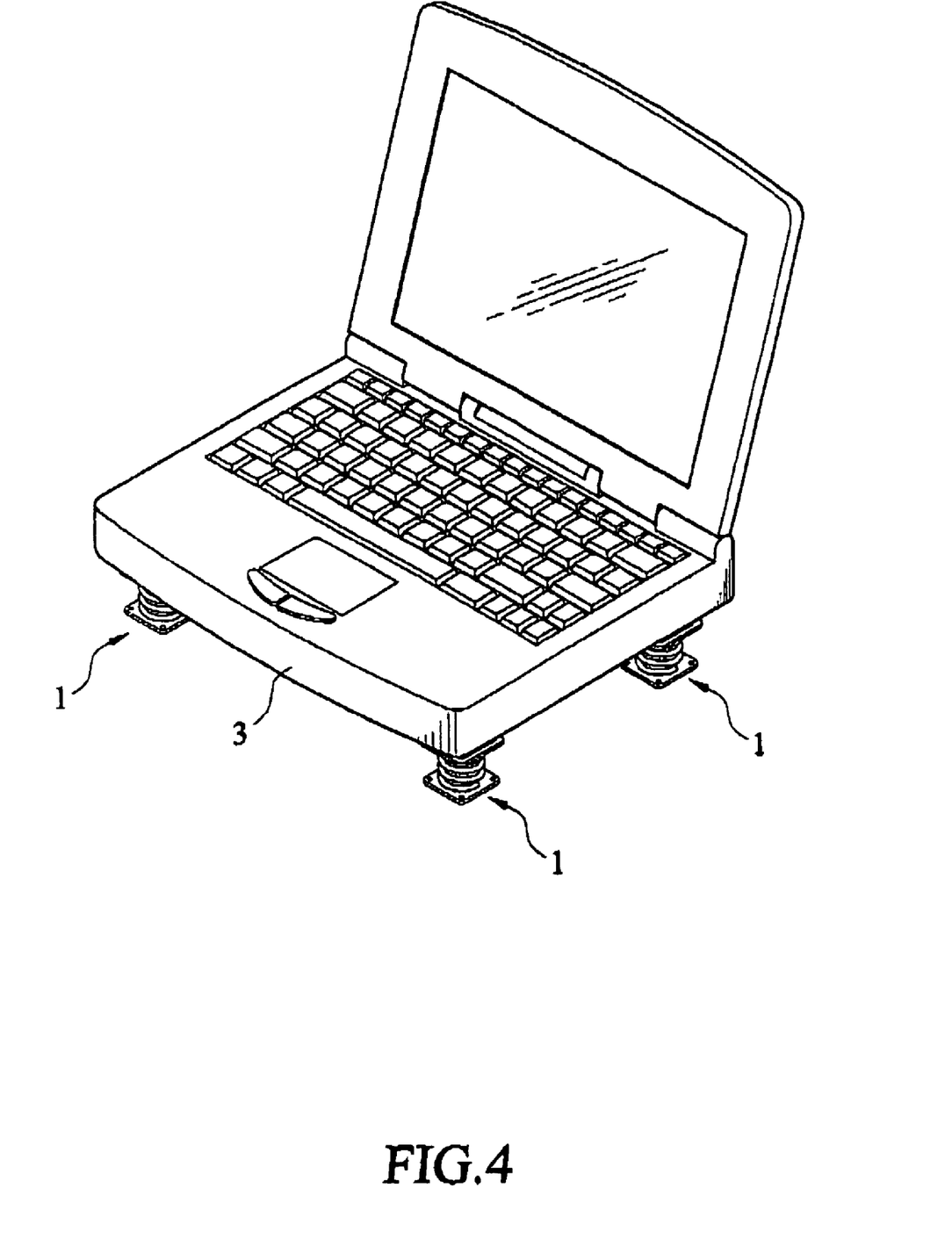
FIG. 4 is a front perspective view showing a plurality of the compound vibration damper assemblies of the present invention are mounted to a bottom of a computer used in an industrial location.
Figure 5:
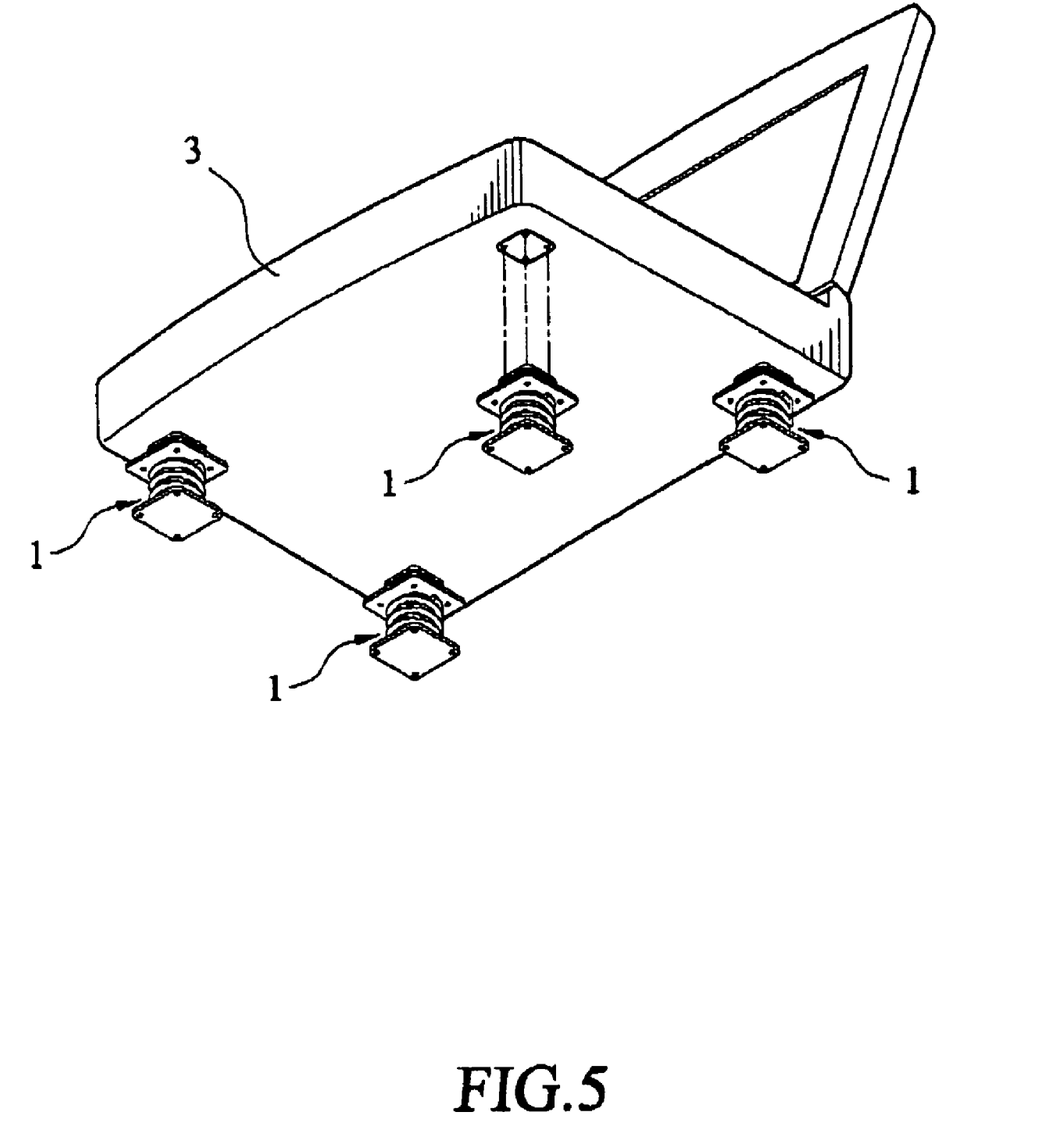
FIG. 5 is a bottom perspective view of FIG. 4.

Please refer to FIGS. 4 and 5. The compound vibration damper assembly 1 of the present invention may be applied to an industrial computer apparatus to protect the same against vibration. To do so, a plurality of the compound vibration damper assemblies 1 are symmetrically mounted to a bottom of the target apparatus 3, that is, the industrial computer apparatus, and the locating bases 11 of the vertical damping units 10 of the compound vibration damper assemblies 1 are fixedly connected to a locating surface 4 (not shown in FIGS. 4 and 5), such as a work platform or an industrial control platform.

Figure 6:
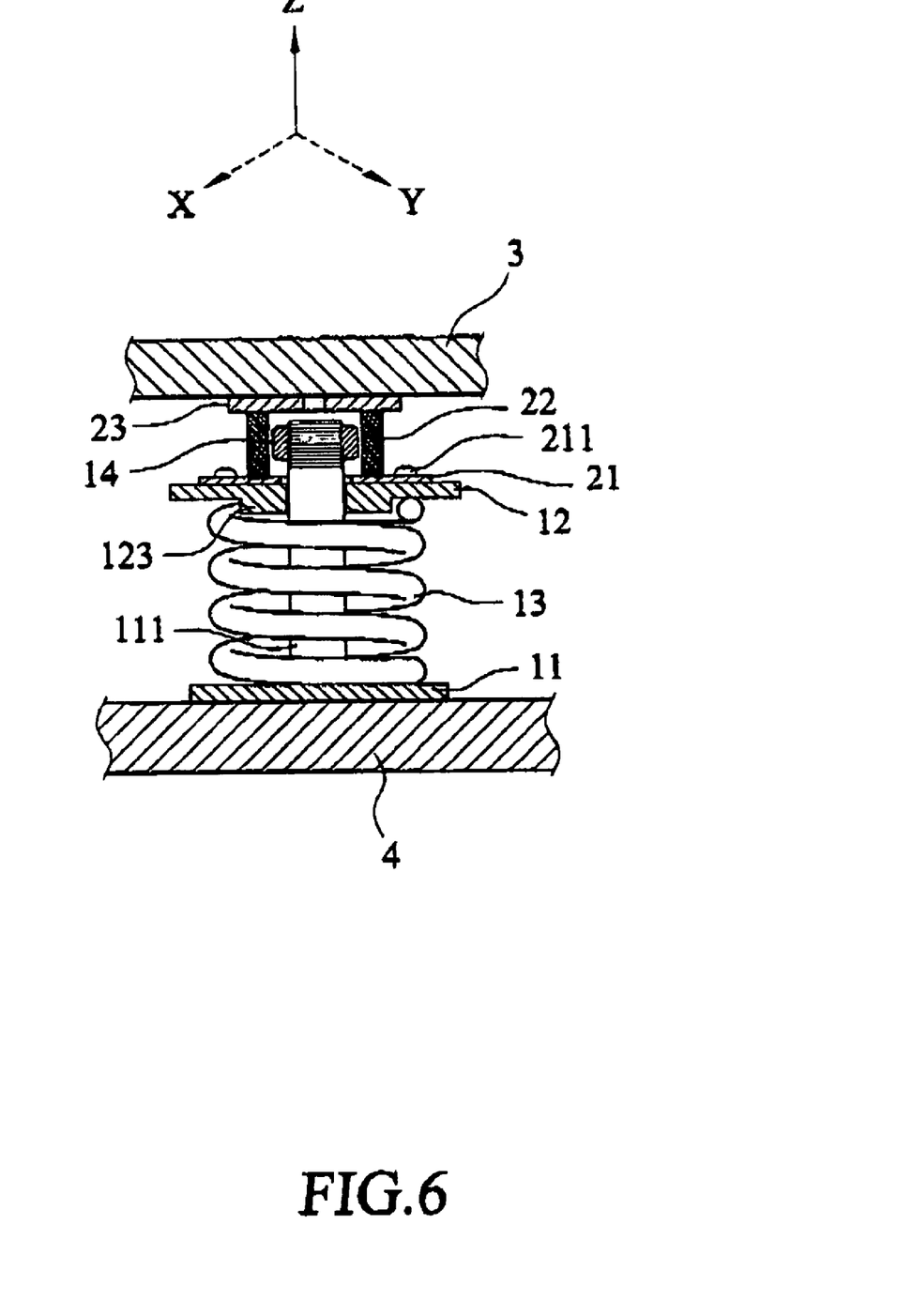
FIG. 6 shows a vibration force applied to the compound vibration damper assembly of the present invention in a vertical direction (or Z direction) is absorbed by a vertical vibration force damping member included in the present invention.

When the compound vibration damper assembly 1 of the present invention is subject to a Z-direction or vertical vibration force, as shown in FIG. 6, the Z-direction vibration force is absorbed by the vertical vibration force damping member 13 without being transmitted to the target apparatus 3 supported on the compound vibration damper assemblies 1. That is, a vibration damping effect in the Z direction is achieved.

Figure 7:
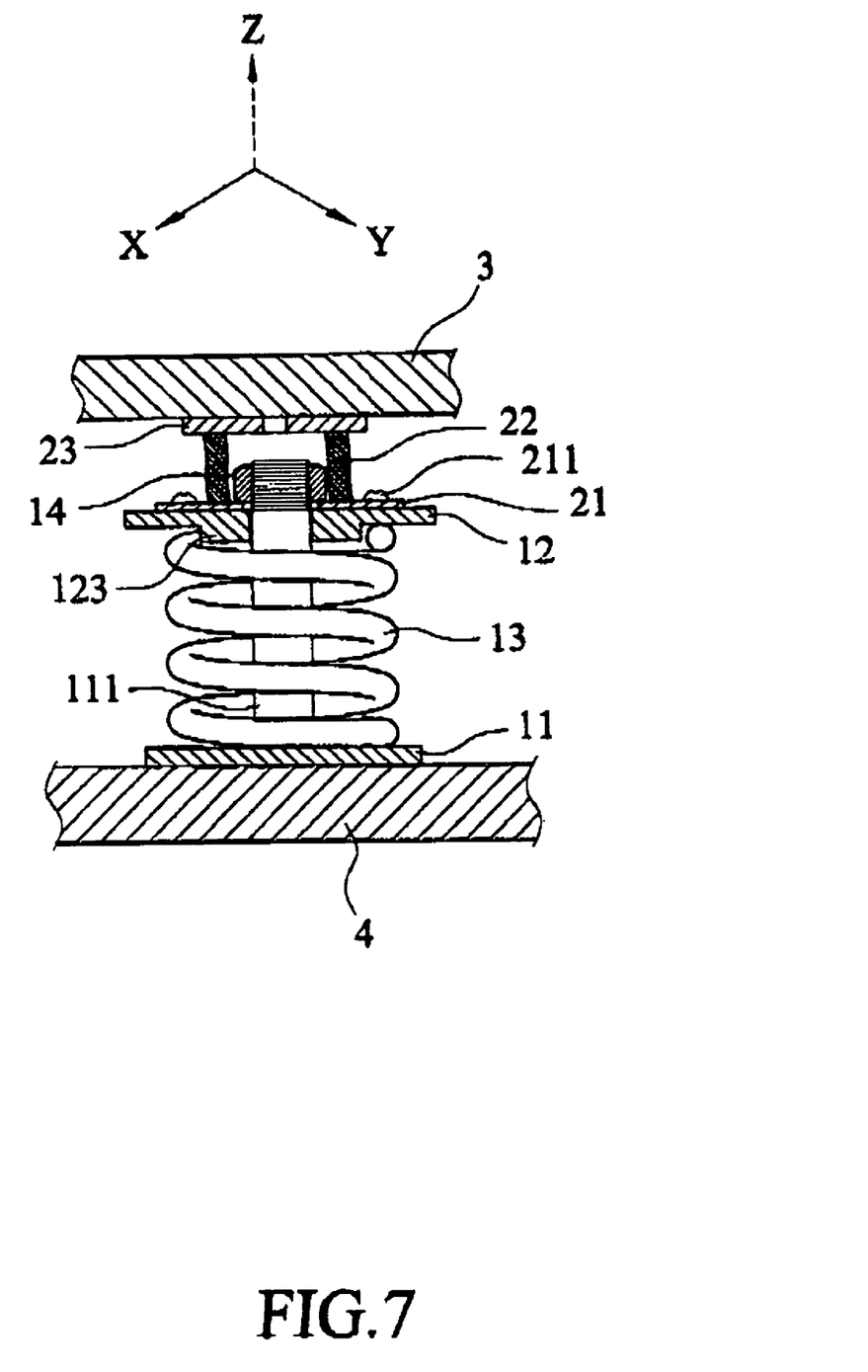
FIG. 7 shows a vibration force applied to the compound vibration damper assembly of the present invention in a horizontal direction (or X or Y direction) is absorbed by a horizontal vibration force damping member included in the present invention.

When the compound vibration damper assembly 1 of the present invention is subject to an X-direction or a Y-direction vibration force (i.e. a horizontal vibration force), as shown in FIG. 7, the X or Y-direction vibration force is absorbed by the horizontal vibration force damping member 22 of the horizontal damping unit 20 without being transmitted to the target apparatus 3 supported on the compound vibration damper assemblies 1. That is, a vibration damping effect in the horizontal direction is achieved.

In brief, in the compound vibration damper assembly 1 of the present invention, the vertical vibration force damping member 13 in the vertical damping unit 10 and the horizontal vibration force damping member 22 in the horizontal damping unit 20 absorb vertical and horizontal vibration forces, respectively, to effectively achieve the vibration damping effect in all directions.

What is claimed is:

1. A compound vibration damper assembly for supporting a target apparatus and absorbing vibration forces transmitted to the target apparatus, comprising:
    a target apparatus positioned on a locating surface, said target apparatus being selected from a group of apparatuses consisting of a computer, a measuring apparatus, and a control apparatus;
    a vertical damping unit including a vertical vibration force damping member located between a lower locating base fixedly mounted on said locating surface and an upper supporting plate for absorbing a Z-direction vibration force transmitted to said target apparatus;

a horizontal damping unit including a horizontal vibration force damping member fixedly mounted at a lower end to a top of said upper supporting plate of said vertical damping unit and at an upper end to a bottom of said target apparatus for absorbing an X-direction vibration force and a Y-direction vibration force transmitted to said target apparatus;

wherein said locating base of said vertical damping unit is fixedly connected at a lower side to the locating surface, and provided at an upper side with an upward projected central column; and wherein said supporting plate is provided with a central opening for said central column to extend therethrough, so that said supporting plate is vertically movably associated with said central column.

2. The compound vibration damper assembly as claimed in claim 1, wherein said locating surface is a work platform.

3. The compound vibration damper assembly as claimed in claim 1, wherein said locating surface is a control platform.

4. The compound vibration damper assembly as claimed in claim 1, wherein said locating surface is an assembling platform.

5. A compound vibration damper assembly for supporting a target apparatus on a locating surface and absorbing vibration forces transmitted to the target apparatus, comprising:

a vertical damping unit including a vertical vibration force damping member located between a lower locating base fixedly mounted on a locating surface and an upper supporting plate for absorbing a Z-direction vibration force transmitted to a target apparatus;

a horizontal damping unit including a horizontal vibration force damping member fixedly mounted at a lower end to a top of said upper supporting plate of said vertical damping unit and at an upper end to a bottom of said target apparatus for absorbing an X-direction vibration force and a Y-direction vibration force transmitted to said target apparatus;

wherein said locating base of said vertical damping unit is fixedly connected at a lower side to the locating surface, and provided at an upper side with an upward projected central column;

wherein said supporting plate is provided with a central opening for said central column to extend therethrough, so that said supporting plate is vertically movably associated with said central column; and wherein said horizontal damping unit further comprises an elastomeric base plate connected at a lower side to the top of said supporting plate of said vertical damping unit, and at an upper side to a lower end of said horizontal vibration force damping member; and an elastomeric top plate connected at a lower side to an upper end of said horizontal vibration force damping member for supporting and mounting to the bottom of said target apparatus.

6. The compound vibration damper assembly as claimed in claim 5, wherein said elastomeric base plate is provided with a plurality of through holes, via which screws are extended to connect said base plate to said vertical damping unit.

7. The compound vibration damper assembly as claimed in claim 5, wherein said horizontal vibration force damping member is made of a rubber material.

8. The compound vibration damper assembly as claimed in claim 5, wherein said horizontal vibration force damping member is a cylindrical member.

9. The compound vibration damper assembly as claimed in claim 5, wherein said horizontal vibration force damping member is internally defined an inner receiving space.

* * * * *